US007853156B2

(12) United States Patent
Grigoryan et al.

(10) Patent No.: US 7,853,156 B2
(45) Date of Patent: Dec. 14, 2010

(54) SYSTEMS AND METHODS FOR THE COHERENT NON-DIFFERENTIAL DETECTION OF OPTICAL COMMUNICATION SIGNALS

(75) Inventors: Vladimir S. Grigoryan, Elkridge, MD (US); Michael Y. Frankel, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 657 days.

(21) Appl. No.: 11/875,622

(22) Filed: Oct. 19, 2007

(65) Prior Publication Data

US 2009/0103931 A1 Apr. 23, 2009

(51) Int. Cl.
*H04B 10/00* (2006.01)
(52) U.S. Cl. .................. 398/203; 398/214; 398/212; 398/155
(58) Field of Classification Search ......... 398/202–214, 398/155
See application file for complete search history.

(56) References Cited

U.S. PATENT DOCUMENTS

| | | | | | |
|---|---|---|---|---|---|
| 5,351,252 | A | * | 9/1994 | Toyama et al. | 372/29.021 |
| 5,537,671 | A | * | 7/1996 | Toyama et al. | 385/27 |
| 6,377,391 | B1 | * | 4/2002 | Vakoc et al. | 359/337.1 |
| 6,813,447 | B2 | * | 11/2004 | Ellis et al. | 398/155 |
| 6,853,774 | B2 | * | 2/2005 | Watanabe | 385/39 |
| 2002/0145795 | A1 | * | 10/2002 | Vakoc et al. | 359/337.4 |
| 2004/0156572 | A1 | * | 8/2004 | Richardson et al. | 385/1 |
| 2005/0063425 | A1 | * | 3/2005 | Krastev et al. | 372/6 |
| 2007/0127932 | A1 | * | 6/2007 | Qi et al. | 398/188 |
| 2008/0180681 | A1 | * | 7/2008 | Digonnet | 356/477 |
| 2009/0169208 | A1 | * | 7/2009 | Grigoryan et al. | 398/65 |

OTHER PUBLICATIONS

S. P. Smith, F. Zarinetchi, and S. Ezekiel; Narrow-linewidth stimulated Brillouin fiber laser and applications; Research Laboratory for Electronics; Massachusetts Institute of Technology; Cambridge, MA 02139; (c) 1991 Optical Society of America.

Jacquest A. Arnaud, Senior Member, IEEE; R-5-Enhancement of Optical Receiver Sensitivities by Amplification of the Carrier; (c) IEEE Journal of Quantum Electronics, vol. QE-4, No. 11, Nov. 1968.

K.J. Williams and R.D. Esman; Stimulated Brillouin scattering for improvement of microwave fibre-optic link efficiency; (c) IEEE 1994; Electronics Letters, Nov. 10, 1994, vol. 30, No. 23.

E. Yamada, K. Suzuki and M. Nakazawa; Subpicosecond optical demultiplexing at 10 GHz with zero-dispersion, dispersion-flattened, nonlinear fibre loop mirror controlled by 500fs gain-switched laser diods; (c) IEEE 2000; Electronics Letters, Nov. 10, 1994, vol. 30, No. 23.

S.J. Strutz and K.J. Williams; Low-noise hybrid erbium/Brillouin amplifier; (c) IEEE 2000; Electronics Letters Onlin No. 200001016; DOI.

* cited by examiner

*Primary Examiner*—Agustin Bello
(74) *Attorney, Agent, or Firm*—Clements Bernard PLLC; Christopher L. Bernard; Tyler S. Brown

(57) ABSTRACT

In various exemplary embodiments, the present invention provides coherent non-differential detection systems and methods for the detection of optical communication signals by the Brillouin fiber amplification of an optical communication signal carrier, the coherent non-differential detection systems including: a Sagnac loop including a single-mode fiber span; a fiber span with negligible birefringence (i.e. a spun fiber span or the like); or a fiber loop with negligible birefringence (i.e. a spun fiber loop or the like).

22 Claims, 3 Drawing Sheets

SYSTEMS AND METHODS FOR THE COHERENT NON-DIFFERENTIAL DETECTION OF OPTICAL COMMUNICATION SIGNALS

FIELD OF THE INVENTION

The present invention relates generally to the optical networking field. More specifically, the present invention relates to systems and methods for the coherent non-differential detection of optical communication signals by the Brillouin fiber amplification (BFA) of the optical communication signal carrier.

BACKGROUND OF THE INVENTION

The coherent non-differential detection of optical communication signals using phase shift keying (PSK) modulation has long been known to offer superior performance relative to conventional direct detection and differential detection techniques. Coherent non-differential PSK techniques allow operation with a lower optical signal-to-noise ratio (OSNR) to be achieved. Coherent non-differential PSK techniques, by preserving and mapping the optical phase of the PSK signal to the electrical domain, also enable efficient chromatic dispersion (CD) compensation and polarization mode dispersion (PMD) compensation in high-speed optical communication systems using low-speed adaptive digital or analog filtering. To date, however, coherent non-differential PSK techniques have not been deployed in high-speed optical communication systems. Building a high-speed coherent receiver of a reasonable complexity and at a reasonable cost still remains a challenge. Such a high-speed coherent receiver must be able to precisely estimate the relative optical phase between the incoming data signal and the Local Oscillator (LO), as well as to lock the optical phase of the LO to the optical phase of the incoming data signal.

The current state-of-the-art for estimating and/or locking the relative optical phase between the incoming data signal and the LO consists of four different techniques. The first technique involves building the optical phase-locked loop (PLL) function directly in the analog domain, detecting the difference between the LO laser and the incoming data signal, and stabilizing the optical phase and polarization of the LO accordingly. The second technique uses an un-stabilized LO and operates in the digital domain by using high-speed real-time analog-to-digital conversion (ADC) and digital signal processing (DSP) techniques to extract the estimated optical phase in the electrical domain. The third technique also uses an un-stabilized LO, but analog signal processing (ASP) in the radio-frequency (RF) domain to extract the estimated optical phase. The fourth technique involves the transmission of a data signal along with an LO pilot tone which is amplified at the receiver.

A major difficulty associated with coherent non-differential detection techniques is the optical PLL that locks the optical phase of the LO field to the optical phase of the carrier field of the optical signal. It is desirable to have a noiseless optical PLL with zero acquisition time. However, in reality, a balance must always be struck between the noise bandwidth and the acquisition speed. This contributes to optical signal degradation and limits the phase acquisition and tracking speed. In addition, the current state-of-the-art DSP-based approach, considered by many to be the most promising, requires a parallel architecture in the high-speed analog-to-digital converters (ADCs), causing a feedback delay. This necessitates the use of narrow-linewidth source lasers in transmitters and LO lasers with sufficiently long coherence time. Thus, the use of distributed-feedback lasers with a linewidth of ~1 MHz becomes problematic. Further, the DSP-based approach is limited by the speed of the ADC and DSP devices currently available. For digital systems, the sampling rate is typically 2× the symbol rate. For symbol rates approaching 40 G symbol/s or higher, the required ADC and DSP devices are not yet available. The same narrow-linewidth laser problem exists for the other coherent non-differential detection techniques using either analog optical PLLs or optical phase recovery in the RF domain.

The transmission of a data signal along with an LO pilot tone solves the problem of maintaining a constant optical phase and frequency relationship between the data signal and the LO, as both originate from the same optical source and traverse the same optical path. However, in order to achieve practical coherent detection, the data signal and the LO must be separated at the receiver and the LO pilot tone must be amplified. This is accomplished by one of two mechanisms. The first mechanism is to add the LO pilot tone at the transmitter on a polarization orthogonal to the data signal. The data signal and the LO are then separated at the receiver via polarization tracking and the LO is preferentially amplified. This mechanism, however, precludes the use of polarization multiplexing for data signal capacity doubling. In addition, PMD and polarization-dependent gain/loss reduce polarization orthogonality. The second mechanism is to add an LO pilot tone that is sufficiently separated from the data signal spectrum in frequency (i.e. wavelength), such that the LO pilot tone may be optically filtered out at the receiver and preferentially amplified. The requirement for such frequency separation is set by the ability of the optical filters to provide selective optical filtering and reduces the spectral efficiency of a wavelength-division multiplexed (WDM) optical communication system. In addition, such frequency separation requires the receiver electronics used to operate at a much higher bandwidth, such that the mixing between the data signal and LO spectra is within the electrical bandwidth of the receiver. Further, due to such frequency separation, the optical phase of the LO pilot tone relative to the phase of the data signal depends on CD. As a consequence, the optical phase difference between the LO pilot tone and the data signal may vary over time due to optical fiber temperature-induced dispersion variations. Although such relative optical phase variations are much slower to develop than the relative optical phase variations associated with the external LO schemes, they must still be tracked by an additional PLL.

BRIEF SUMMARY OF THE INVENTION

In various exemplary embodiments, the present invention provides a novel homodyne detection technique that has the following advantages: 1) it does not require an external receiver laser source as an LO; 2) it uses the inherent narrow-band properties of a Brillouin amplifier (BA) (i.e. a few MHz) to provide optical filtering far tighter than that available from passive optical filters; and 3) it provides near-ideal synchronization of the optical phase, state of polarization, and frequency between the LO and a data signal, as both originate from the same optical source and traverse nearly the same optical path. In general, the LO is extracted from the data signal using BFA of the signal carrier frequency component to create a Virtual Local Oscillator (VLO).

In one exemplary embodiment, the present invention provides a coherent non-differential detection system for the detection of optical communication signals by the Brillouin fiber amplification of an optical communication signal carrier, the coherent non-differential detection system including: a Sagnac loop including a single-mode fiber span, wherein the Sagnac loop is operable for receiving a modulated signal polarized in a predetermined direction, and wherein a first part of the modulated signal propagates in a clockwise direction in the Sagnac loop and a second part of the modulated signal propagates in a counter-clockwise direction in the Sagnac loop; a Brillouin amplifier coupled to the Sagnac loop, wherein the Brillouin amplifier is operable for amplifying a carrier component of one of the first part of the modulated signal and the second part of the modulated signal; and a receiver including a first input port and a second input port coupled to the Sagnac loop, wherein the receiver is operable for receiving the amplified carrier component of the one of the first part of the modulated signal and the second part of the modulated signal at the first input port and the amplified carrier component of the one of the first part of the modulated signal and the second part of the modulated signal plus the unamplified one of the first part of the modulated signal and the second part of the modulated signal at the second input port, and wherein the amplified carrier component of the one of the first part of the modulated signal and the second part of the modulated signal operates as a Virtual Local Oscillator.

In another exemplary embodiment, the present invention provides a coherent non-differential detection method for the detection of optical communication signals by the Brillouin fiber amplification of an optical communication signal carrier, the coherent non-differential detection method including: propagating a first polarization component and a second polarization component of a modulated signal along mutually orthogonal vertical and horizontal polarizations in a fiber span with negligible birefringence (i.e. a spun fiber span or the like); using a Brillouin amplifier having a pump wave polarized in a first direction, selectively amplifying only light co-polarized with the Brillouin amplifier pump wave, yielding an amplified Local Oscillator with a residual modulated signal in a first polarization and an unamplified modulated signal in a second polarization; and, using a receiver, receiving the amplified Local Oscillator with the residual modulated signal in the first polarization and the unamplified modulated signal in the second polarization and performing coherent non-differential detection of the modulated signal using the amplified Local Oscillator operating as a Virtual Local Oscillator.

In a further exemplary embodiment, the present invention provides a coherent non-differential detection method for the detection of optical communication signals by the Brillouin fiber amplification of an optical communication signal carrier, the coherent non-differential detection method including: propagating a first polarization component and a second polarization component of a modulated signal along mutually orthogonal vertical and horizontal polarizations in a fiber loop with negligible birefringence (i.e. a spun fiber loop or the like); using a Brillouin amplifier having a pump wave polarized in a first direction, selectively amplifying only light co-polarized with the Brillouin amplifier pump wave, yielding an amplified Local Oscillator with a residual modulated signal in a first polarization and an unamplified modulated signal in a second polarization; and, using a receiver, receiving the amplified Local Oscillator with the residual modulated signal in the first polarization and the unamplified modulated signal in the second polarization and performing coherent non-differential detection of the modulated signal using the amplified Local Oscillator operating as a Virtual Local Oscillator.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Again, in various exemplary embodiments, the present invention provides a novel homodyne detection technique that has the following advantages: 1) it does not require an external receiver laser source as an LO; 2) it uses the inherent narrow-band properties of a BA (i.e. a few MHz) to provide optical filtering far tighter than that available from passive optical filters; and 3) it provides near-ideal synchronization of the optical phase, state of polarization, and frequency between the LO and a data signal, as both originate from the same optical source and traverse nearly the same optical path. In general, the LO is extracted from the data signal using BFA of the signal carrier frequency component to create a VLO.

Figure 1:
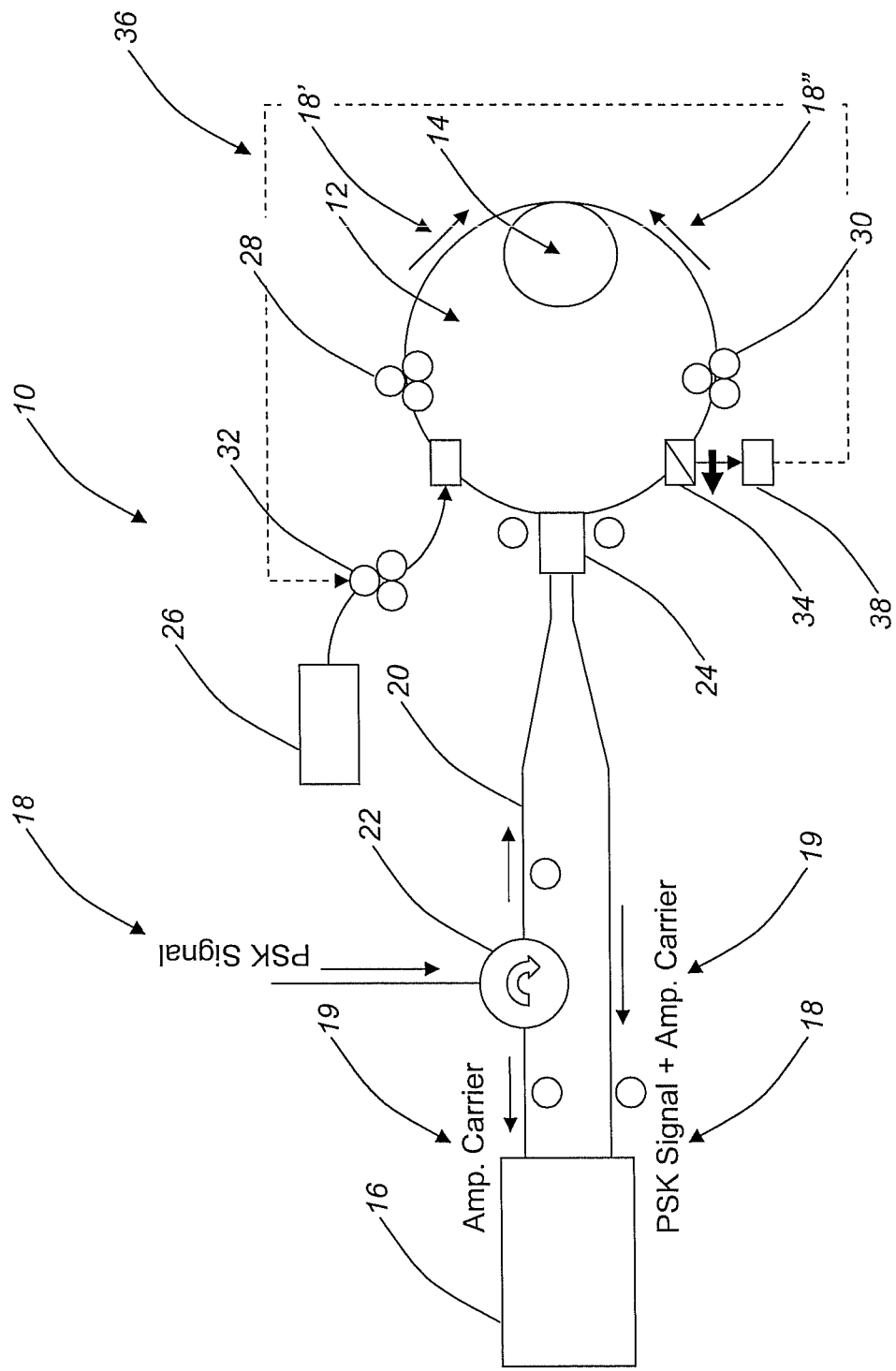
FIG. 1 is a schematic diagram illustrating one exemplary embodiment of the coherent non-differential detection system of the present invention, the coherent non-differential detection system incorporating a BA pump, and detecting a PSK optical communication signal.

Referring to FIG. 1, in one exemplary embodiment, the coherent non-differential detection system 10 of the present invention consists of two major components: 1) a Sagnac loop 12 including a single-mode fiber (SMF) span 14 and 2) a receiver 16 based on a PSK hybrid. A vertically-polarized PSK signal 18 enters the Sagnac loop 12 through a polarization-maintaining fiber (PMF) 20, a circulator 22, and a polarization-maintaining coupler (PMC) 24, such as a 3 dB PMC. As a result, one part of the PSK signal 18' propagates in a clockwise direction in the Sagnac loop 12 and another part of the PSK signal 18" propagates in a counter-clockwise direction in the Sagnac loop 12. The SMF span 14 of the Sagnac loop 12 is pumped by a continuous wave (CW) distributed feedback (DFB) laser 26 with a central frequency that is de-tuned from the PSK signal carrier frequency by ~10.57 Ghz (i.e. the Brillouin scattering frequency shift in SMF) in order to enable the Brillouin amplification of the counter-clockwise-propagating carrier component of the PSK signal 18". As the carrier component of the PSK signal 18 is amplified, the base band of the PSK signal 18 beyond the Brillouin amplification bandwidth of ~10 MHz remains unaffected by the BA pump 26.

Fiber polarization controllers, FC1 28 and FC2 30, are set such that the Sagnac loop 12 operates in a transmission mode. This means that the PSK signal 18, entering the Sagnac loop 12 through the upper input port, exits the Sagnac loop 12 only through the lower output port. In addition, FC1 28 and FC2 30 are adjusted such that the output light from the Sagnac loop 12 is vertically polarized.

The state of polarization of the BA pump 26 is controlled by an electro-optic polarization controller (PC) 32 such that the remainder of the pump wave at the input to a polarizer (PZ) 34 remains horizontally polarized. In this case, the remainder of the pump wave, being polarized orthogonally to the PSK signal 18, is separated from the PSK signal 18 by the PZ 34. An electronic control loop 36 is set to automatically adjust the PC 32 by maximizing the current at a photodiode (PD) 38 associated with the PC 32.

As a result, only the amplified carrier component 19 of the PSK signal 18 enters the PSK hybrid receiver 16 through the upper output port of the Sagnac loop 12, whereas the PSK signal 18 and the amplified carrier component 19 of the PSK signal 18 enter the PSK hybrid receiver 16 through the lower output port of the Sagnac loop 12. The power of the amplified carrier component 19 of the PSK signal 18 is split equally between the upper and lower output ports of the Sagnac loop 12 at the inputs to the PSK hybrid receiver 16, given that the PMC 24 in the Sagnac loop 12 has a 3 dB coupling coefficient. In the PSK hybrid receiver 16, the amplified carrier component 19 of the PSK signal 18 operates as a VLO, which is automatically set in phase to and in the same polarization with the PSK signal 18, to enable homodyne detection. Because the VLO is split equally between the inputs of the PSK hybrid receiver 16, a 180% hybrid is used in the setup for homodyne detection of both the in-phase and quadrature components of the PSK signal 18, instead of a 90% hybrid.

It should be noted that, with respect to the above description, some form of data line coding is required, as signal content must still be separable from the LO by at least the BA gain linewidth, which is on the order of a few MHz. Such data line coding is well known to those of ordinary skill in the art and is used extensively in telephone systems to avoid severe electrical attenuation below ~300 Hz, for example.

Figure 2:
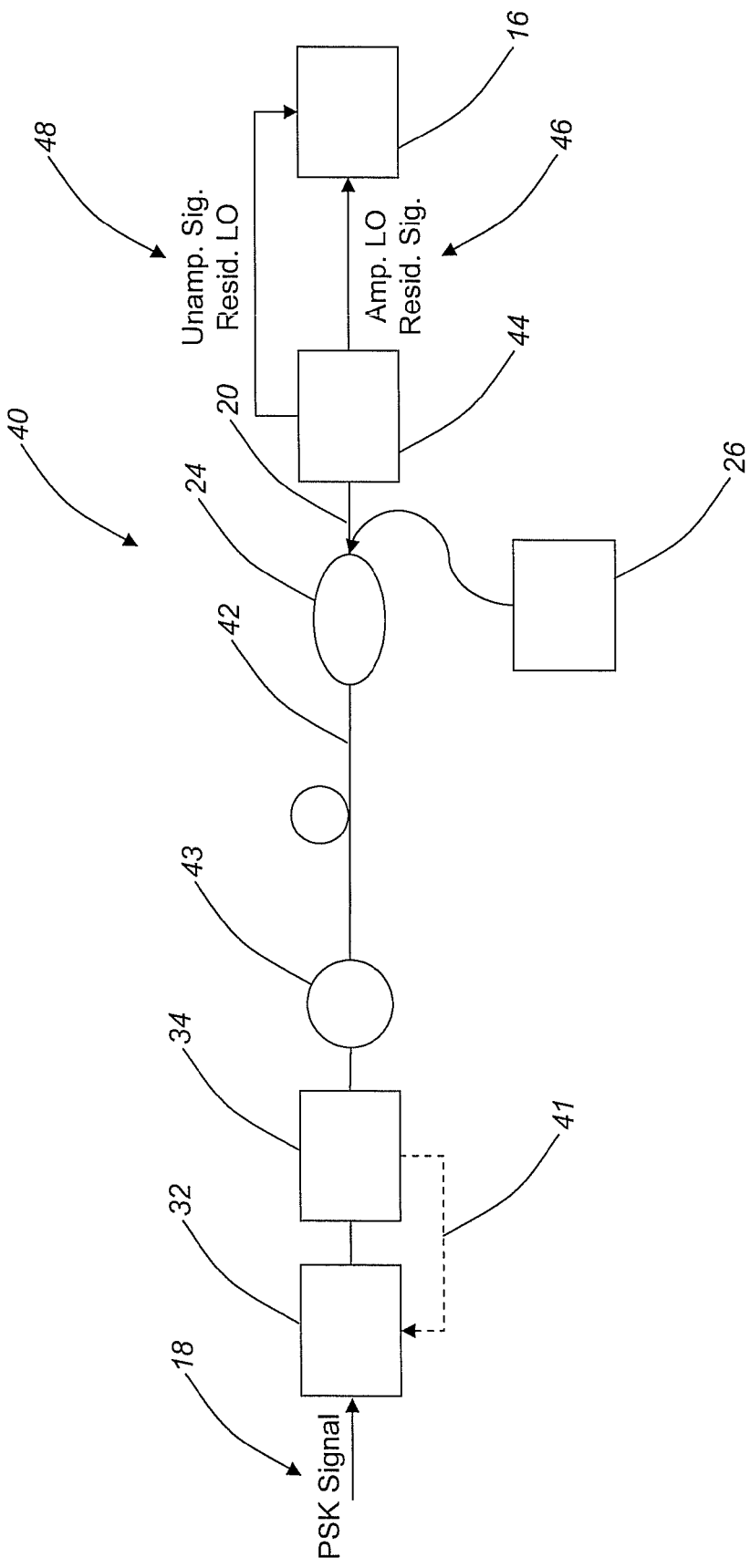
FIG. 2 is a schematic diagram illustrating another exemplary embodiment of the coherent non-differential detection system of the present invention, the coherent non-differential detection system incorporating a BA pump and spun fiber, and detecting a PSK optical communication signal.

Referring to FIG. 2, in another exemplary embodiment, the coherent non-differential detection system 40 of the present invention relies on the separable propagation of the LO and the PSK signal 18 along mutually orthogonal vertical and horizontal polarizations in a spun fiber span 42. One useful property of a spun fiber is that, in contrast to conventional fiber, the state of polarization of light propagating in the spun fiber does not change over distance. The PSK signal 18 is first sent to the PC 32 and PZ 34 (or polarization diversity receiver), collectively utilizing a polarization control feedback loop 41, and then an $X^0$ splice 43. The splice rotation angle controls the power split ratio between the vertical polarization and horizontal polarization components of the PSK signal 18 in the spun fiber, with less optical power being intended for the vertical polarization component relative to the horizontal polarization component. As the BA pump wave is polarized in the vertical direction and the Brillouin amplification occurs only for light co-polarized with the BA pump 26 via the PMC 24, one may selectively amplify either vertical or horizontal polarization in the spun fiber span 42. Preferably, the BA pump 26 is launched in the vertical polarization in the spun fiber span 42 in a direction counter-propagated to the PSK signal 18. As a result, a carrier frequency from only the vertically-polarized PSK signal component is amplified, yielding an LO in the vertical polarization, whereas the horizontally-polarized PSK signal component remains unchanged. Using a polarization beam splitter/combiner 44, the amplified LO with the residual PSK signal 46 in the vertical polarization may be separated from the unamplified PSK signal in the horizontal polarization. These are then sent to the PSK hybrid receiver 16 for coherent non-differential detection.

Figure 3:
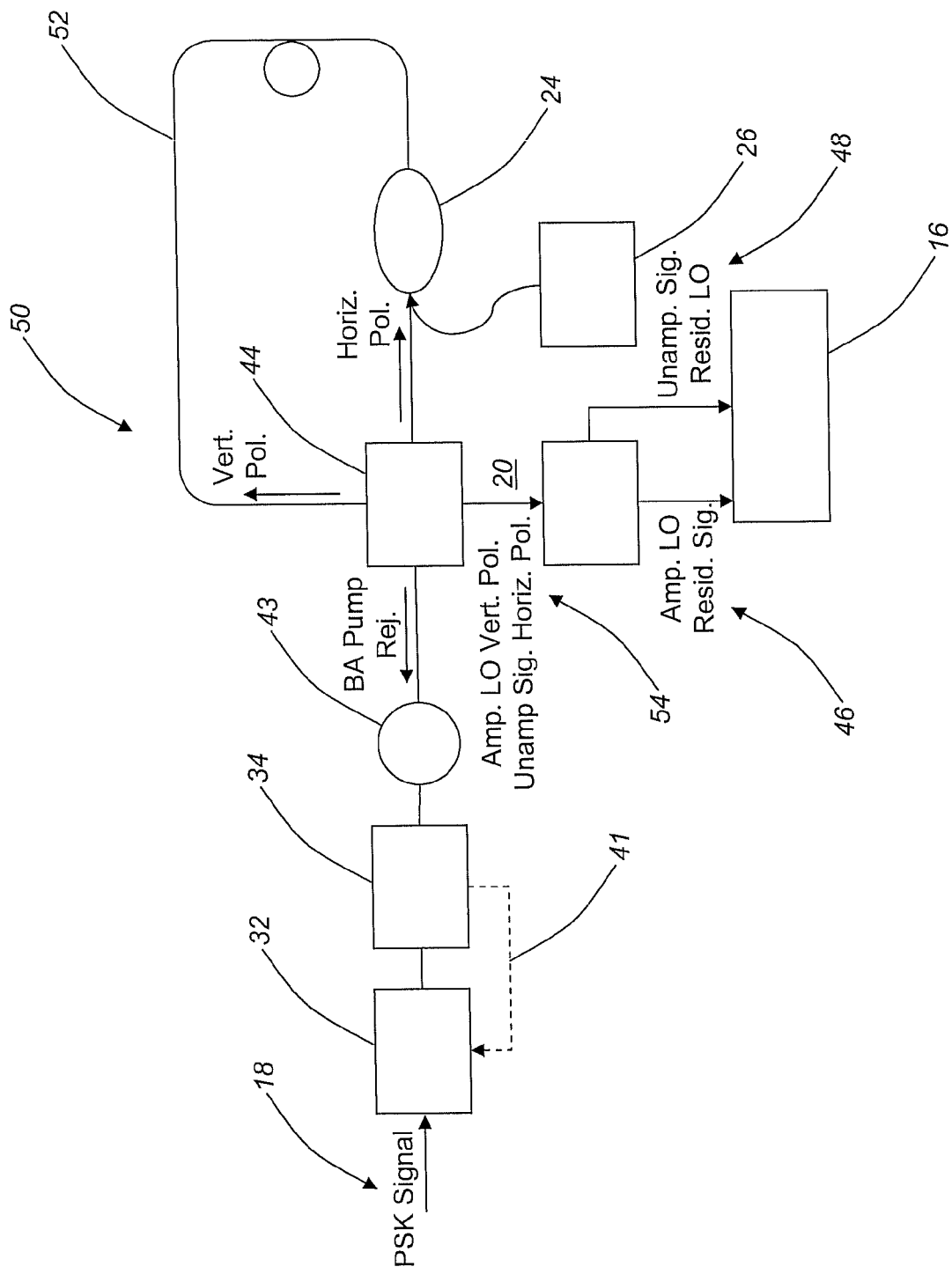
FIG. 3 is a schematic diagram illustrating a further exemplary embodiment of the coherent non-differential detection system of the present invention, the coherent non-differential detection system incorporating a BA pump and a spun fiber loop, and detecting a PSK optical communication signal.

Referring to FIG. 3, in a further exemplary embodiment, the coherent non-differential detection system 50 of the present invention relies on the separable propagation of the LO and the PSK signal 18 along mutually orthogonal vertical and horizontal polarizations in a spun fiber loop 52. Again, one useful property of a spun fiber is that, in contrast to conventional fiber, the state of polarization of light propagating in the spun fiber does not change over distance. The PSK signal 18 is first sent to the PC 32 and PZ 34 (or polarization diversity receiver), collectively utilizing a polarization control feedback loop 41, and then an $X^0$ splice 43. The splice rotation angle controls the power split ratio between the vertical polarization and horizontal polarization components of the PSK signal 18 in the spun fiber, with less optical power being intended for the vertical polarization component relative to the horizontal polarization component. As the Brillouin amplification occurs only for light co-polarized with the BA pump 26 via the PMC 24, one may selectively amplify either vertical or horizontal polarization in the spun fiber loop 52. Preferably, the BA pump 26 is launched in the vertical polarization in the spun fiber loop 52 in a direction counter-propagated to the PSK signal 18. As a result, a carrier frequency from only the vertically-polarized PSK signal component is amplified, yielding an LO in the vertical polarization, whereas the horizontally-polarized PSK signal component remains unchanged, being co-propagated to the PSK signal 18 in the horizontal polarization. Using the polarization beam splitter/combiner 44, the amplified LO in the vertical polarization with the residual PSK signal in the horizontal polarization 54 is sent to another polarization beam splitter/combiner 56 and the amplified LO with the residual PSK signal 46 in the vertical polarization is separated from the unamplified PSK signal in the horizontal polarization. These are then sent to the PSK hybrid receiver 16 for coherent non-differential detection.

In general, the Brillouin amplification-based coherent non-differential detection technique of the present invention has the following advantages relative to conventional LO-based coherent detection techniques: 1) neither analog phase locking/tracking nor digital phase tracking is necessary—the VLO extracted from the signal, by the Brillouin amplification of the signal carrier, is automatically locked to the signal, which is equivalent to instantaneous phase locking/tracking and 2) it is a scalable and economic solution for high-speed optical fiber communication systems and, unlike the DSP-based techniques, it is not limited by the speed of the ADC converters. These advantages may be traded for a significant enhancement in the performance and efficiency of both analog and digital coherent optical communication systems. In particular, by transferring the optical phase of the signal to the electrical domain, the Brillouin amplification-based coherent non-differential detection technique enables efficient CD and PMD compensation in high-speed optical fiber communication systems using low-speed adaptive digital filtering.

The Brillouin amplification-based coherent non-differential detection technique of the present invention is attractive for use in 40 Gb/s phase shift keying (PSK) and 100 Gb/s Ethernet systems being developed, among others Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A coherent non-differential detection system for the detection of optical communication signals by the Brillouin fiber amplification of an optical communication signal carrier, the coherent non-differential detection system comprising:
  a Sagnac loop comprising a single-mode fiber span, wherein the Sagnac loop is operable for receiving a modulated signal polarized in a predetermined direction, and wherein a first part of the modulated signal propagates in a clockwise direction in the Sagnac loop and a second part of the modulated signal propagates in a counter-clockwise direction in the Sagnac loop;
  a Brillouin amplifier coupled to the Sagnac loop, wherein the Brillouin amplifier is operable for amplifying a carrier component of one of the first part of the modulated signal and the second part of the modulated signal; and
  a receiver comprising a first input port and a second input port coupled to the Sagnac loop, wherein the receiver is operable for receiving the amplified carrier component of the one of the first part of the modulated signal and the second part of the modulated signal at the first input port and the amplified carrier component of the one of the first part of the modulated signal and the second part of the modulated signal plus the unamplified one of the first part of the modulated signal and the second part of the modulated signal at the second input port, and wherein the amplified carrier component of the one of the first part of the modulated signal and the second part of the modulated signal operates as a Virtual Local Oscillator.

2. The coherent non-differential detection system of claim 1, wherein the modulated signal comprises a phase shift keyed modulated signal.

3. The coherent non-differential detection system of claim 2, wherein the modulated signal polarized in the predetermined direction comprises a phase shift keyed modulated signal polarized in a vertical direction.

4. The coherent non-differential detection system of claim 1, wherein the Sagnac loop is operable for receiving the modulated signal polarized in the predetermined direction via a polarization-maintaining fiber, a circulator, and a polarization-maintaining coupler.

5. The coherent non-differential detection system of claim 1, wherein the Brillouin amplifier comprises a continuous wave distributed feedback laser with a central frequency that is de-tuned from the carrier frequency of the modulated signal.

6. The coherent non-differential detection system of claim 1, wherein the Sagnac loop further comprises one or more fiber polarization controllers that are set such that the Sagnac loop operates in a transmission mode.

7. The coherent non-differential detection system of claim 6, wherein the Sagnac loop further comprises an upper input port through which the modulated signal enters the Sagnac loop and a lower output port through which the modulated signal exits the Sagnac loop.

8. The coherent non-differential detection system of claim 7, wherein the modulated signal exiting the Sagnac loop is polarized in the predetermined direction.

9. The coherent non-differential detection system of claim 1, wherein the power of the modulated signal is split equally between the first input port and the second input port of the receiver.

10. The coherent non-differential detection system of claim 1, wherein the Virtual Local Oscillator is automatically set in phase to and in the same polarization with the modulated signal, thereby enabling homodyne detection of the modulated signal by the receiver.

11. A coherent non-differential detection method for the detection of optical communication signals by the Brillouin fiber amplification of an optical communication signal carrier, the coherent non-differential detection method comprising:
  propagating a first polarization component and a second polarization component of a modulated signal along mutually orthogonal vertical and horizontal polarizations in a fiber span with negligible birefringence;
  using a Brillouin amplifier having a pump wave polarized in a first direction, selectively amplifying only light co-polarized with the Brillouin amplifier pump wave, yielding an amplified Local Oscillator with a residual modulated signal in a first polarization and an unamplified modulated signal in a second polarization; and
  using a receiver, receiving the amplified Local Oscillator with the residual modulated signal in the first polarization and the unamplified modulated signal in the second polarization and performing coherent non-differential detection of the modulated signal using the amplified Local Oscillator operating as a Virtual Local Oscillator.

12. The coherent non-differential detection method of claim 11, further comprising, using a splice rotation angle, controlling the power split ratio between the Local Oscillator and the modulated signal.

13. The coherent non-differential detection method of claim 12, wherein less power is utilized for the Local Oscillator.

14. The coherent non-differential detection method of claim 12, wherein more power is utilized for the modulated signal.

15. The coherent non-differential detection method of claim 11, wherein the first polarization comprises the vertical polarization and the second polarization comprises the horizontal polarization.

16. The coherent non-differential detection method of claim 11, wherein the Virtual Local Oscillator is automatically set in phase to and in the same polarization with the modulated signal, thereby enabling homodyne detection of the modulated signal by the receiver.

17. A coherent non-differential detection method for the detection of optical communication signals by the Brillouin fiber amplification of an optical communication signal carrier, the coherent non-differential detection method comprising:
  propagating a first polarization component and a second polarization component of a modulated signal along mutually orthogonal vertical and horizontal polarizations in a fiber loop with negligible birefringence;
  using a Brillouin amplifier having a pump wave polarized in a first direction, selectively amplifying only light co-polarized with the Brillouin amplifier pump wave, yielding an amplified Local Oscillator with a residual modulated signal in a first polarization and an unamplified modulated signal in a second polarization; and
  using a receiver, receiving the amplified Local Oscillator with the residual modulated signal in the first polarization and the unamplified modulated signal in the second polarization and performing coherent non-differential detection of the modulated signal using the amplified Local Oscillator operating as a Virtual Local Oscillator.

18. The coherent non-differential detection method of claim 17, further comprising, using a splice rotation angle, controlling the power split ratio between the Local Oscillator and the modulated signal.

19. The coherent non-differential detection method of claim 18, wherein less power is utilized for the Local Oscillator.

20. The coherent non-differential detection method of claim 18, wherein more power is utilized for the modulated signal.

21. The coherent non-differential detection method of claim 17, wherein the first polarization comprises the vertical polarization and the second polarization comprises the horizontal polarization.

22. The coherent non-differential detection method of claim 17, wherein the Virtual Local Oscillator is automatically set in phase to and in the same polarization with the modulated signal, thereby enabling homodyne detection of the modulated signal by the receiver.

* * * * *